Feb. 13, 1934.     F. H. OWENS     1,946,588
OPTICAL SYSTEM AND FOCUSING MEANS THEREFOR
Filed Oct. 5, 1929
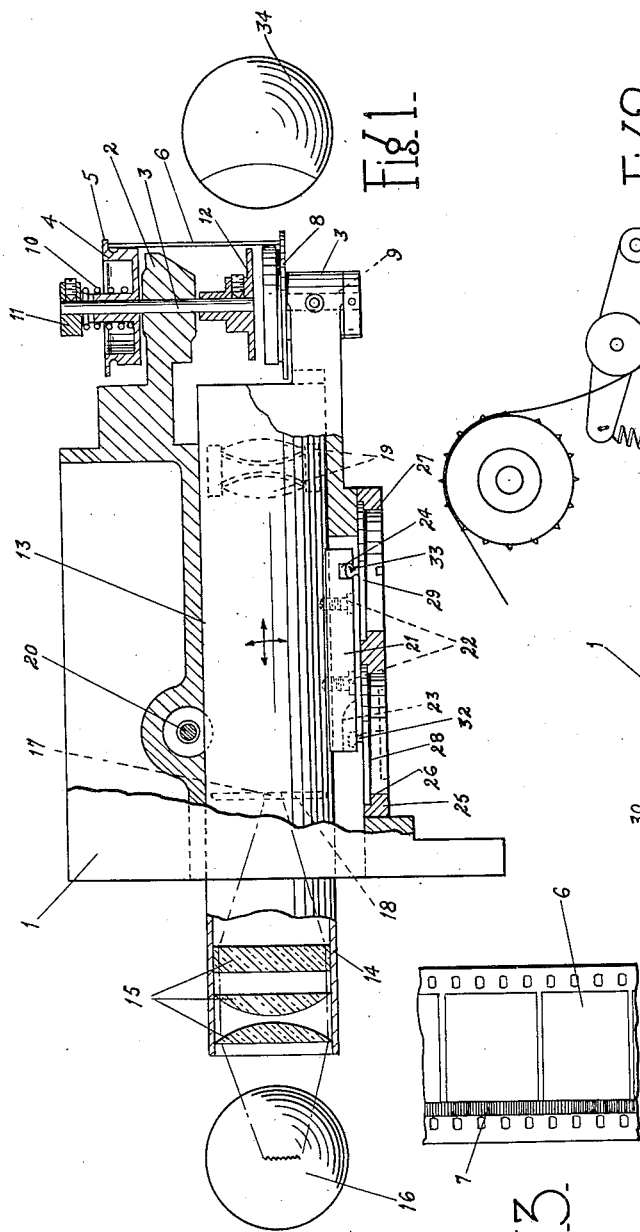
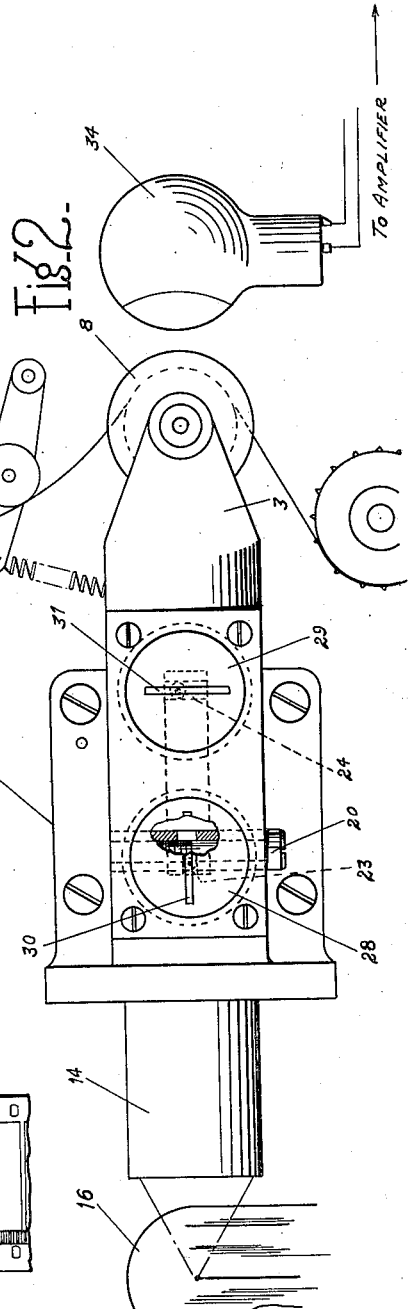
INVENTOR.
FREEMAN. H. OWENS.
BY
ATTORNEY.

Patented Feb. 13, 1934

1,946,588

UNITED STATES PATENT OFFICE 1,946,588

OPTICAL SYSTEM AND FOCUSING MEANS THEREFOR

Freeman H. Owens, New York, N. Y.

Application October 5, 1929. Serial No. 397,504

3 Claims. (Cl. 179—100.31)

This invention relates to an optical system and focusing means therefor particularly adaptable for use in recording and reproducing sound photographically.

In the art of recording and reproducing sound photographically it is absolutely necessary for proper control of the light used in such recording or reproducing, that the slit through which the light passes to the film be in perfect alignment with the sound track on the film and that the lenses of the optical system which serve to focus the illuminated aerial image of the slit upon the film, be in perfect focus with respect to the film. Various means for these adjustments have been provided in the past but have been difficult of assembly and of proper adjustment, requiring accurate measurements, skilled operators, etc. This difficulty has been particularly noticeable in the reproducing equipment installed in theatres for the reproduction of photographic sound records. The projectionists are usually unskilled in the art of sound reproduction of this character and if it occurs that due to accident or inadvertence, the slit adjustment or lens focus or both, become displaced, the operator is often unable to make the fine corrections necessary. Likewise, it sometimes occurs that means other than improper positioning of the slit and lenses cause poor reproduction and an inexperienced operator through ignorance blames it upon the slit and optical system and endeavors to correct the error by moving them out of adjustment.

The primary object of my invention is to provide an optical unit and adjusting means therefor, both for the angular position of the slit and for the lens focus, which is easily assembled and easily adjusted and which may be manipulated to proper adjustment with minimum ease by an inexperienced operator. My invention also enables the operator to quickly and rapidly check the adjustment of the lens and slit and bring them to proper positions for best reproduction.

Other objects and advantages in details of construction and arrangement of parts will be apparent as the description now proceeds, reference being had to the figures of the accompanying drawing forming a part of this application and wherein like reference numerals indicate like parts.

In the drawing:—

Figure 1 is a top plan view of my improved optical system and adjusting means therefor, certain parts being broken away and shown in section for clearness of illustration.

Figure 2 is a side view of the same, certain parts being also broken away here for clearness.

Figure 3 is a detailed view of a section of motion picture film having a sound record thereon.

Reference character 1 denotes a supporting casing which may be part of the casting of a projector or sound reproducing equipment therefor. It should be stated here that although my invention has been illustrated and will be described specifically as applied to sound reproducing apparatus, it is not limited thereto but is also adaptable for use with photographic recording means as well. The casing 1 may be provided adjacent one end with a pair of spaced extensions 2 and 3, the extension 2 forming the bearing for a shaft 3 upon which may be rotatably mounted, a flanged roller 4 engageable with one side or edge of a motion picture film 6 which may be moved over the roller 4 by any suitable means and which carries a photographic sound record as indicated at 7 in Figure 3. In axial alignment with the roller 4 and spaced therefrom is a second flanged supporting roller 8 which may be secured upon a stub shaft 9 journaled in the extension 3 of the casing 1. A coiled spring 10 may be provided about the hub of the roller 4 and engageable at one end against a fixed collar 11, whereby to normally urge the roller 4 inwardly or toward the flanged roller 8 whereby to maintain the film in proper alignment over the rollers 4 and 8.

Also suitably mounted upon the shaft 3 and lying adjacent to but spaced slightly from the flanged roller 8 is a flat disk 12 between the outer surface of which and the inner surface of the roller 8, the light from the optical system passes to the sound track 7 on the film 6. This provides a light confining path through which the reproducing light is focused upon the sound track 7.

The casing 1 is provided with a tubular opening 13, adapted to adjustably receive the optical system used for reproducing sound from the film 6. This system is preferably enclosed in a tubular housing 14, slidably and rotatably mounted within the opening 13 in the casing 1. In one end of the tubular housing 14 are located condenser lenses 15 adapted to collect the light rays from a suitable lamp 16 and focus the same upon a slit 17 in a plate or partition 18 secured within the tube. Adjacent the opposite end of the tube 14 is located a focusing lens unit 19 in proper focal relation to the slit 17, whereby the illuminated aerial image of such slit may be focused upon the sound record 7 of the film 6.

Any suitable clamping means such as the common screw clamp device 20 may be provided in the casing 1 to lock the tube 14 in the casing in its adjusted position. For adjusting the tube 14 rotatably within the casing 1 and longitudinally so as to properly align the slit 17 with the sound record 7 and to properly focus the illuminated image of the slit sharply upon the sound record, the tube 14 is provided on one side with a fixed plate 21 suitably secured to the tube as by screws 22. This plate 21 is provided in one of its surface with a longitudinal groove or slit 23 and in another portion with a vertical slit 24. The wall 25 of the casing 1 adjacent this plate 21 is provided with a pair of circular openings 26 and 27 adapted to rotatably receive a pair of disks 28 and 29 respectively.

These disks 28 and 29 are provided on their outer faces with key slots 30 and 31 respectively, adapted to receive the keys or other tools whereby the disks may be rotated.

The disk 28 carries on its inner surface and projecting into the casing and into engagement with the slit 23 in the plate 21 a pin 32 positioned eccentrically of the disk 28 whereby rotation of the disk will through the medium of the pin 32 and the slit 23 serve to rotate the tube 14 within the casing 1. By this rotatable adjustment of the tube 14, the slit 17 can be brought into perfect alignment with the sound record 7 on the film 6. The disk 29 is provided on its inner surface with a pin 33 engageable within the vertical slot 24 in the plate 21. This pin 33 is mounted eccentrically of the disk 29 whereby upon rotation of this disk through the medium of the pin 33, in the slit 24, the tube 14 may be adjusted longitudinally within the casing 1 whereby to properly focus the illuminated aerial image of the slit 17 upon the sound track 7.

Thus an operator finding it necessary to adjust the angle of the slit or the focus of the lens system, may by the use of a screw driver or other suitable tool, make such adjustments quickly and easily by simply rotating the disks 28 and 29. It will be understood, of course, that before such adjustments can be made, the clamping screw 20 must be loosened so as to permit the rotation and sliding movement of the tube 14. When the adjustments have been completed however, the screw 20 may again lock the tube in adjusted position.

Of course, in the reproduction of photographic sound records a photoelectric cell or other light sensitive element 34 is provided to receive the light rays modulated by the sound record of the film, the output of the cell having suitable connections with amplifiers and loud speakers whereby the sound record may be rendered audible.

Of course, many changes may be made in details of construction and arrangement of parts without departing from the spirit and scope of my invention. I do not limit myself therefore, to the exact form herein described and shown other than by the appended claims.

I claim:—

1. In combination with a sound recording or reproducing apparatus including a source of light, a supporting member, a tube in said member carrying a slit member and optical means in alignment with said light, and means for rotatively and longitudinally adjusting said tube in said member, said adjusting means comprising manually operable pins engageable in grooves provided in said tube, said pins being mounted eccentrically in rotatable members accessible for turning.

2. In combination with a sound recording or reproducing apparatus including a source of light, a supporting member, a tube in said member carrying a slit member and optical means in alignment with said light, and means for rotatively and longitudinally adjusting said tube in said member, said adjusting means comprising manually operable pins engageable in grooves provided in said tube, said pins being mounted eccentrically in rotatable members accessible for turning, one of said grooves being disposed longitudinally of the tube and the other laterally thereof.

3. In combination, a support, a lens mount adjustable in said support, adjusting means for said lens mount comprising a rotatable disc on said support and means co-operating between said disc and said lens mount for adjusting said mount upon rotation of said disc, said means comprising a pin mounted eccentrically on said disc and engaging a slot in said lens mount.

FREEMAN H. OWENS.